March 1, 1949. R. GRANT 2,463,377
BRAKE TESTING MACHINE
Filed May 11, 1945 2 Sheets-Sheet 1
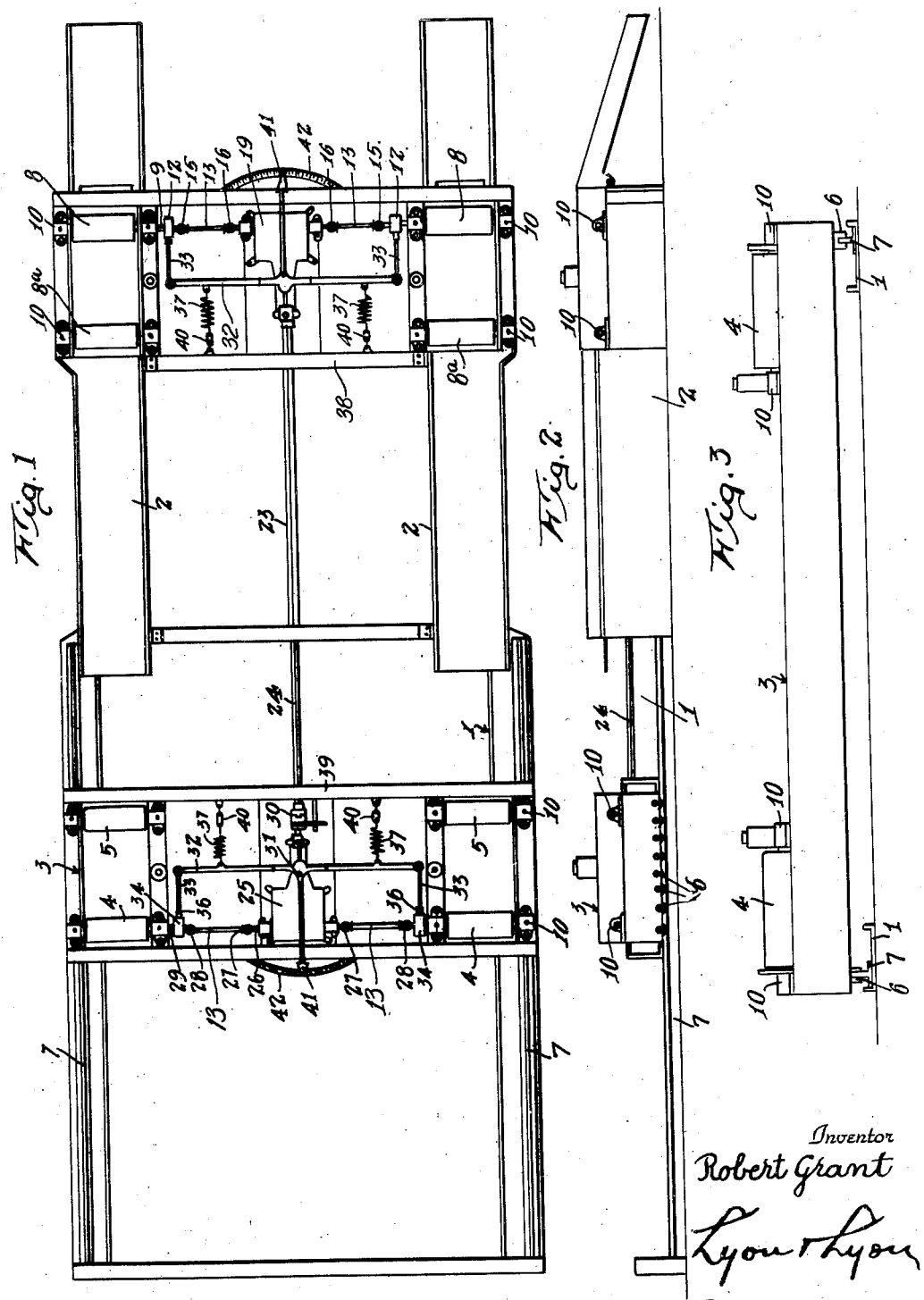
Inventor
Robert Grant
By Lyon & Lyon
Attorneys

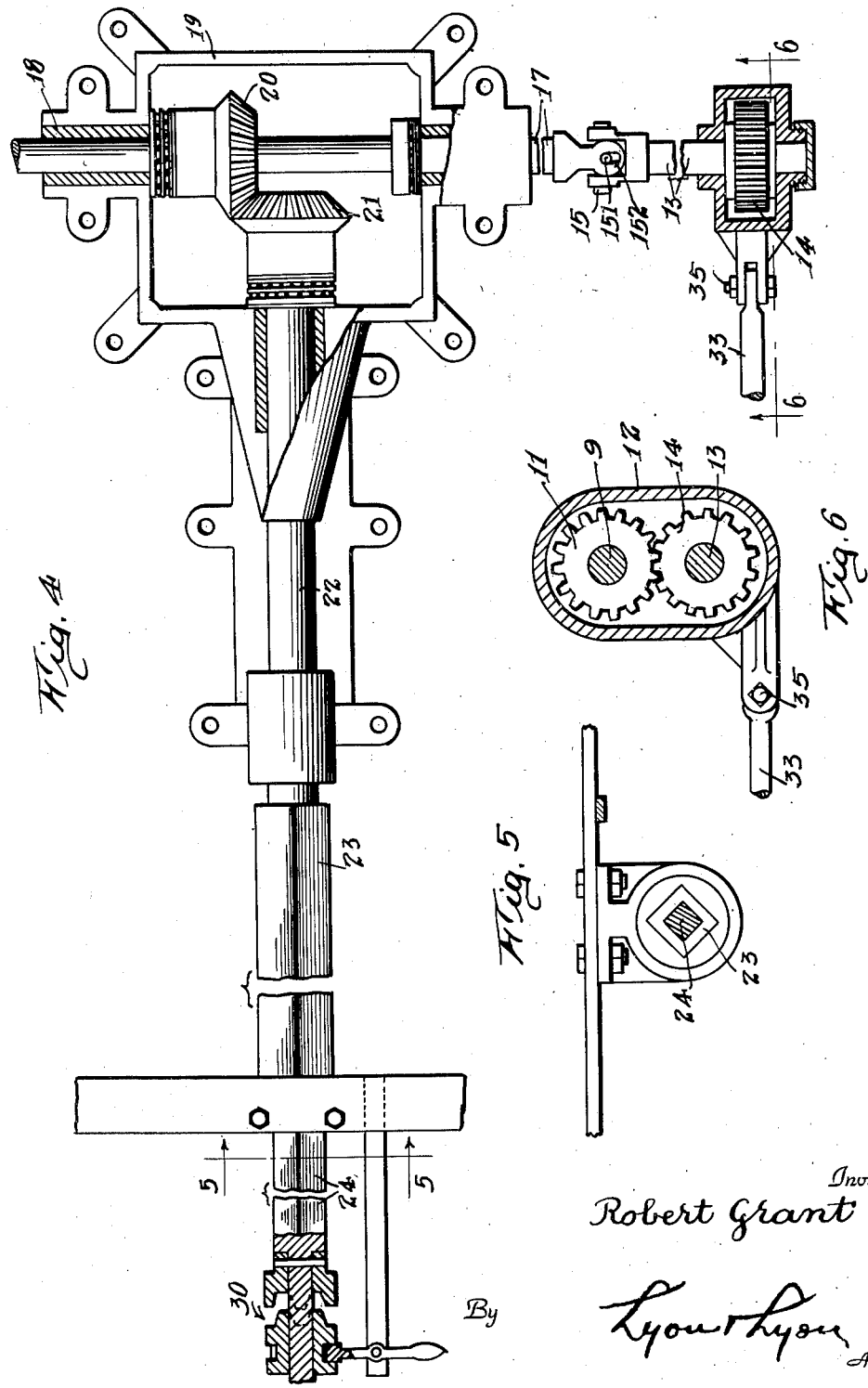

Patented Mar. 1, 1949

2,463,377

UNITED STATES PATENT OFFICE 2,463,377

BRAKE-TESTING MACHINE

Robert Grant, Los Angeles, Calif., assignor of one-half to Jennie W. Turner, Los Angeles, Calif.

Application May 11, 1945, Serial No. 593,287

15 Claims. (Cl. 73—121)

This invention relates to brake testing apparatus, and more particularly to an apparatus to use in testing the brakes of automobiles or the like.

In the testing of automobile brakes it is now common practice to employ an apparatus including a pair of spaced runways onto which the automobile is adapted to be driven, and on which runway there is positioned driven elements for engaging and driving the four wheels of motor vehicles.

The braking force developed by the brakes against the power thus applied externally of the motor vehicle to drive the wheels is measured by various means and it is endeavored to adjust the brakes and determine the braking force thus applied by the brakes against such revolving members so that the brakes may be set to produce a definite braking force and may be equalized one against the other.

The difficulty inherent with such structures, however, is primarily occasioned by the method of driving the wheels of the motor vehicle in that the exterior method of driving the wheels does not position upon the brakes the same conditions of operation as are encountered when the brakes are actually employed for the purpose of stopping a motor vehicle. Such slight variations as difference in tire tread, difference in air inflation in the tires, and like variables, so govern the readings obtained of the braking force when applied against an exterior driving means as to give readings for such braking force as applied to each of the wheels, which are purely imaginary and have no real relation to the braking force actually existent when the brakes are applied to arrest a motor vehicle on a roadway.

It is an object of this invention to provide a brake testing apparatus which is operable under as near road conditions as possible for measuring and determining the brake resistance at speeds at which the brakes will actually be employed for arresting the travel of a motor vehicle. It employs, to this end, an apparatus which utilizes the power of the motor vehicle engine itself to rotate the wheels against the resistance set up by the brakes.

Another object of this invention is to provide a brake testing apparatus which includes means which may be utilized for measuring the independent brake resistance on the front and rear wheels of the motor vehicle independently, and which may be utilized for determining when the correct ratio of braking resistance between the front and rear wheels has been provided.

Another object of this invention is to provide a simple and inexpensive form of brake-testing apparatus.

Other objects and advantages of this invention it is believed will be apparent from the following detailed description of a preferred embodiment thereof as illustrated in the accompanying drawings.

In the drawings:

Figure 1 is a plan view of a brake testing machine embodying my invention.

Figure 2 is a side elevation thereof.

Figure 3 is a front end elevation thereof.

Figure 4 is an enlarged fragmental plan view partly in section of a driving means embodied in my invention.

Figure 5 is a sectional view taken substantially on the line 5—5 of Figure 4.

Figure 6 is an elevational sectional view in the plane 6—6 of Figure 4.

In the preferred embodiment of my invention illustrated in the accompanying drawings, there is illustrated a supporting structure 1, to which spaced channel irons 2 are secured to provide runways for the wheels of a motor vehicle.

Mounted so as to move longitudinally in the supporting structure 1, and on the supporting structure 1, is a carriage 3 which is provided with two pair of spaced rollers 4 and 5 upon opposite sides of the supporting structure 1 and between which rollers 4 and 5 the forward wheels of a motor vehicle are adapted to rest.

The carriage 3 is mounted upon a plurality of rollers 6 which ride on tracks 7 secured to the supporting structure 1.

Mounted in the channel irons 2 are spaced rollers 8 and 8ª between which the rear wheels of the motor vehicle are adapted to be positioned.

The rollers 8 are driven from the rear or drive wheels of a motor vehicle, and means are provided for connecting the rollers 8 with the rollers 4 so that the rollers 4 are driven from the drive wheels of a motor vehicle, which means are preferably of the following construction:

The rollers 8 are mounted upon shafts 9 in bearings 10. Secured to each shaft 9 is a pinion 11 mounted within a gear case 12. Rotatably mounted within each gear case 12 is a shaft 13, and a second pinion 14 in mesh with the pinion 11, so that as each shaft 9 is driven the associated shaft 13 is driven through the meshing gears 11 and 14.

The shafts 13 are each connected by means of universal joints 15 and 16 with a countershaft 17. The countershaft 17 is journaled in bearings 18 mounted in a gear housing 19. Secured to the shaft 17, within the housing 19, is a beveled pinion 20 which is adapted to mesh with a beveled pinion 21. The beveled pinion 21 is secured to the rear end of an extensible front wheel drive shaft 22 which is supported by bearings secured to the housing 19 and the carriage 3 respectively.

The shaft 22 is made extensible by providing on the forward end thereof a hollow squared shaft 23 within which a square extension 24 is adapted to slide as the carriage 3 moves to and fro on the runways 7 to adjust its position on the supporting structure 1 as is required by the varying spacings of the front and rear wheels of different motor vehicles. The shaft 24 is geared, in a second gear housing 25, by means of beveled gears similar to the gears 20 and 21, to a shaft 26. The shaft 26 is connected through universal joints 27 and 28 and intermeshed pinions in housings 34 with shafts 29, to which the rollers 4 are secured. The arrangement of the pinions in housings 34 is exactly the same as the arrangement of pinions 11 and 14 in housings 12, (Figure 4). Mounted on the carriage 3 is a clutch 30 which is inserted in the shaft 24 to permit disconnection of the rollers 4 from driving relation with the rollers 8.

In order to measure the braking force exerted by the brakes of a motor vehicle, the wheels of which are positioned in driving relation upon the rollers 8 and 4, and to determine the difference in the braking power thus exerted on the respective wheels of the motor vehicle, the following means are preferably provided:

Pivotally mounted at 31 on both the fore and aft portions of the braking apparatus are balance levers 32 which are connected by means of links 33 with the gear case housings 12 and 34, respectively. The rods 33 are pivotally secured at points 35 (Figure 6) to said gear housings at one end and to the outer ends of the balance levers 32 at their opposed ends.

Springs 37 are connected between the balance levers 32 and the beams 38 and 39 of the supporting structure 1 and carriage 3 respectively and are provided with means, diagrammatically illustrated as turn-buckles at 40, for adjusting and equalizing the tension of the opposed springs 37. Secured to each balance lever 32 intermediate its ends is an indicator 41. Secured to the carriage 3, and to the supporting structure 1, respectively, are scales 42, upon which the indicators 41 are adapted to indicate the difference in braking force applied to the two front wheels and the two rear wheels, respectively.

In the operation of the device as described later, the housings 12 execute partial rotations about shaft 9. As a result of such rotation, the shafts 13 are displaced from alignment with shaft 17 and at the same time are lengthened very slightly. The displacement from alignment imposes no strains, because of the universal joints 15, and the elongation, which does not exceed a small fraction of an inch, is permitted by loosely fitting the pins 151 of the universal joints in the yokes 152 of the joints, or by providing elongated apertures in the yokes as shown in Figure 4.

The mode of operation of my brake tester is:

In equalizing the braking forces applied to the respective four wheels of a motor vehicle, the vehicle is driven over the guides 2 until the non-driving wheels, usually the front wheels, are engaged by the rollers 4 and 5; thereafter as the vehicle continues to move forward, the carriage 3 moves along the tracks 7 until the rear wheels are engaged between the rollers 8 and 8ª. The engine of the motor vehicle is then operated, through any gear of the transmission, to drive the driven wheels of the motor vehicle, usually the rear wheels, thereby driving the rollers 8. The rollers 8, through the shafts 9, pinions 11 and 14, shafts 13 and 17, drive the beveled gear 20, which drives the beveled gear 21 and drives the longitudinal extensible shaft 22 to drive through a similar mechanism the front rollers 4, thereby driving the forward wheels, or non-driving wheels, of the motor vehicle. With the engine of the motor vehicle operating, the brake pedal is depressed and the pressing of the brake pedal will cause an unequal resistance, if the brakes are unequal, to be set up to the driving of the rollers 8 and 4 so that one or more of the pinions 14 will climb around its associated pinion 11 to a greater extent than the opposite one, thereby exerting a greater force through the related link 33 to the balance lever 32 and causing the associated indicator 41 to shift from zero reading on the dial 42 in the direction of the wheel where the brake force is the greater.

By sufficiently tightening the brake band upon the brake drum of the opposite wheel the indicator 41 will be caused to return to a zero reading, which indicates that the same braking force is applied to the brake drums of each of the rear or forward wheels, as the case may be. In this manner the brakes of both front and rear wheels may be equalized and, furthermore, may be equalized at speeds of operation which are consistent with the speeds of actual operation of the motor vehicle under road conditions. A motor vehicle may be operated on this brake testing machine with its wheels rotating at a speed equivalent to a vehicle speed of 25, 30 or more miles per hour so that the brakes will be caused to operate as nearly under actual road driving conditions as it is possible to obtain with the vehicle stationary.

In determining the braking force applied to any one or all of the wheels of a motor vehicle, if it is found that the ratio of braking forces applied to the front and rear wheels is not correct, or that there is insufficient braking force applied to any particular wheel of the motor vehicle, it is possible, when employing my apparatus and method of testing the brakes of a motor vehicle, to determine, or predetermine, the exact braking force that is to be applied to the brake drum of any given wheel, and consequently, to determine, or predetermine, the ratios of the braking resistances that will be applied to the different wheels under working conditions.

In order to accomplish this result, when employing my apparatus, all the brakes are released by releasing the brake bands on the brake drums and the brake pedal depressed the proper degree and held in depressed position by means of a suitable bracket, jack or the like. The engine of the motor vehicle is then caused to operate at a speed of approximately 25 miles per hour and the brake band on the brake drum of one of the forward wheels is tightened until the pointer 41 moves on the dial 42 to indicate that a predetermined brake load has been applied, say approximately 40 pounds. The opposite brake band is then tightened on the brake drum of the opposite wheel until the indicator 41 moves back to a zero reading, at which time the brake force applied to the two drums will be equal, thereby equalizing the braking force applied to the two forward wheels and applying to each of the two forward wheels a braking force of 40 pounds at the particular speed of operation chosen. A predetermined braking resistance is then provided for the rear wheels by throwing out the clutch 30 to release the rollers 4 from the rollers 8. The brake drum of one of the rear wheels is then tightened until a braking force of, for example, 60 pounds is exerted by the brake band against the brake drum of this rear wheel, as indicated by the position of the indicator 41 on the dial 42.

The brake band on the brake drum of the opposite rear wheel is then tightened until the indicator 41 returns to a zero reading, at which time the brake force applied to the brake drums of the opposed rear wheels will be equal. In this manner a predetermined amount of resistance of braking force is provided for each of the brake bands of the four wheels of the motor vehicle and a predetermined ratio of braking force between the front and rear wheels of the motor vehicle is established.

The determining of the braking force applied to each wheel may be accomplished without the use of the clutch 30 when the speed of the motor of the vehicle is maintained at a constant speed, by merely following the operation above outlined. For first speed, the brakes of one pair of wheels are set to apply a predetermined brake load at a definite speed and then the brakes of the opposite pair of wheels are set to apply a predetermined brake load at the same speed of the engine of the motor vehicle. As the brake load is increased on the four wheels of the motor vehicle, it will of course be necessary to increase the power output of the motor to maintain a given speed; this may be done easily, however, by use of the throttle. It is particularly necessary to maintain a constant speed of rotation of the wheels of the motor vehicle if a definite relation is desired between the braking action on the forward and rearward wheels of the vehicle.

Having fully described my invention, it is to be understood that I do not wish to be limited to the details herein set forth, but my invention is of the full scope of the appended claims.

I claim:

1. In a brake tester for testing brake resistance to the turning movement of the wheels of a motor vehicle, the combination of rollers adapted to be driven from the driving wheels of the motor vehicle, shafts upon which said rollers are secured, bearings for supporting said shafts, gear cases mounted for pivotal movement about said shafts, pinions mounted on said shafts within said gear cases, second pinions mounted in each gear case in position to mesh with the first said pinions, shafts secured to said second pinions, a connecting shaft, universal joints connecting the connecting shaft with the shafts secured to the second said pinions, a balance lever to resist pivotal movement of said gear cases, links connecting the balance lever with the gear cases, an indicator dial, and an indicator connected with the balance lever.

2. In a device of the class described, the combination of a pair of spaced rollers, means for driving the rollers from the drive wheels of a motor vehicle, roller shafts upon which said rollers are fixed, a shaft offset in alignment from the roller shafts, a pair of means for rotatably connecting the roller shafts with the offset shaft, said means being pivoted about said roller shafts, a pivotally mounted balancing lever, and links connecting the opposed ends of the balancing lever to the respective means connecting the roller shafts to the offset shaft at points displaced from the axes of said roller shafts, whereby unequal rotative forces applied to said respective rollers tend to unequally rotate said respective means about said roller shafts, and thereby displace the opposed ends of said lever in different degree.

3. In a device of the class described, the combination of a pair of spaced rollers, means for driving the rollers from the drive wheels of a motor vehicle, roller shafts upon which said rollers are fixed, a shaft offset in alignment from the roller shafts, a pair of means for rotatably connecting the roller shafts with the offset shaft, each of which means is mounted for pivotal movement, a pivotally mounted balancing lever for resisting pivotal movement of said connecting means, means connecting the opposed ends of the balancing lever with the means connecting the roller shafts to the offset shaft, and means connected with the balancing lever to yieldably hold the balancing lever from pivoting around its pivoted mounting.

4. In a device of the class described, the combination of a pair of spaced rollers, means for driving the rollers from the drive wheels of a motor vehicle, roller shafts upon which said rollers are fixed, a shaft offset in alignment from the roller shafts, a pair of means for rotatably connecting the roller shafts with the offset shaft, each of which means is mounted for pivotal movement, a pivotally mounted balancing lever for resisting pivotal movement of said connecting means, means connecting the opposed ends of the balancing lever with the means connecting the roller shafts to the offset shaft, and means for determining the force required to rotate the balancing lever.

5. In a device of the class described, the combination of a pair of spaced rollers adapted to be driven from the drive wheels of a motor vehicle, roller shafts upon which said rollers are fixedly mounted, a shaft offset in alignment from the roller shafts, meshing gears connecting the roller shafts and the offset shaft, a pair of means rotatably supported upon said roller shafts for rotatably supporting said gears in meshing relation with each other, a pivotally mounted balancing lever for resisting rotation of said gear supporting means, and means connecting the opposed ends of the balancing lever with said gear supporting means at points displaced from said roller shafts.

6. In a device of the class described, the combination of a pair of spaced rollers adapted to be driven from the drive wheels of a motor vehicle, roller shafts upon which said rollers are fixedly mounted, a shaft offset in alignment from the roller shafts, gears rotatably coupling the roller shafts with the offset shaft, a pair of rotatably mounted housings in which said gears are housed, a pivotally mounted balancing lever for resisting rotational movement of said housings, and means connecting the opposed ends of the balancing lever with said respective housings at points displaced from their axes of rotation.

7. In a device of the class described, the combination of a rear pair of rolling elements adapted to be driven from the drive wheels of a motor vehicle, a front pair of rolling elements, each pair of rolling elements comprising rollers fixedly mounted upon roller shafts, a pair of shafts offset in alignment from the respective roller shafts, means mounted for pivotal movement connecting the respective roller shafts with the respective offset shafts, a pair of pivotally mounted balancing levers for resisting pivotal movement of said connecting means, means connecting the opposed ends of each of the balancing levers with the respective means connecting each pair of roller shafts to the associated offset shaft, means rotatably connecting the offset shaft of the rear rolling elements with the offset shaft of the front rolling elements, and means for indicating when unbalance forces are applied to the opposed ends of each of said balancing levers.

8. In a brake tester for testing the brake resistance to the turning movement of the wheels of a motor vehicle, the combination of a pair of opposite rollers adapted to be driven from the opposite driving wheels of a motor vehicle, a pair of shafts upon which said respective rollers are secured for rotation therewith, bearings for supporting said shafts, a pair of gear cases mounted for pivotal movement about said respective shafts, pinions mounted upon said shafts within said respective gear cases, a second pinion mounted in each of said respective gear cases in position to mesh with the first mentioned pinion therein, shafts secured to the second pinions, a connecting shaft, universal joints connecting the connecting shafts with the shafts secured to the respective second pinions, a shaft extending at right angles to the connecting shaft, means for rotatably coupling the said right angle shaft and connecting shaft together, a second pair of rollers positioned to be in driving relation with the non-driving wheels of a motor vehicle, means connecting the right angle shaft with said last rollers to drive the non-driving wheels of the motor vehicle from the driving wheels of the motor vehicle, a balance lever to resist pivotal movement of said gear cases, links connecting the balance lever with the gear cases, an indicator dial and an indicator connected with the balance lever.

9. In a brake tester for testing the brake resistance to the turning movement of the wheels of a motor vehicle, the combination of a set of rollers adapted to be driven from the driving wheels of a motor vehicle, shafts upon which said rollers are secured, a shaft extending at right angles to the shafts of said rollers, and means for coupling the roller shafts to the right angle shaft to rotate the latter in response to rotation of the rollers, a pair of opposite rollers positioned to be in driving relation with the opposite non-driving wheels of a motor vehicle, a pair of shafts upon which said last mentioned rollers are secured, bearings for supporting said last mentioned shafts, a pair of gear cases mounted for pivotal movement about said respective last mentioned shafts, a pair of pinions mounted on said last mentioned shafts within said respective gear cases, a second pair of pinions mounted in said respective gear cases in position to mesh with said first pinions, shafts secured to the second pinions, a connecting shaft, universal joints connecting the connecting shaft with the shafts secured to said second pinions, means for rotatably coupling said right angle shaft to said connecting shaft, a balance lever to resist pivotal movement of said gear cases, links connecting the balance lever with the gear cases, an indicator dial and an indicator connected with the balance lever.

10. In a brake tester for testing the brake resistance to turning movement of the wheels of a vehicle, the combination of a pair of driving rollers, a pair of shafts driven by the said rollers, a pair of pinions mounted on the respective shafts, a pair of second pinions meshing with said respective first pinions, gear cases for containing the pairs of meshing pinions mounted for pivotal movement about said first-mentioned pinion shafts, means connecting the said second mentioned pinions together to prevent relative rotation thereof, a balance lever to resist pivotal movement of said gear cases, and means connecting opposite ends of the balance lever to said respective gear cases at points displaced from the shafts upon which they are pivotally mounted, whereby rotation of said gear cases about said shafts displaces the ends of said balance lever.

11. In a brake tester, the combination of means driven by the opposite driving wheels of a motor vehicle, means for driving the opposite non-driving wheels of the motor vehicle, means for connecting the said driven means with said driving means, and means for determining the relative braking resistance applied to the opposite driving wheels, respectively, and to the opposite non-driving wheels, respectively, including a plurality of means each mounted for pivotal movement in response to torque applied therethrough, and one of which is operatively inserted in each of the respective driven and driving means associated with the wheels of the vehicle to be tested, and a pair of balance levers for restraining pivotal movements of said torque responsive means, each lever being connected at its opposite ends to the respective torque responsive means associated with opposite wheels of the vehicle to be tested.

12. In a brake tester, the combination of means driven by the opposite driving wheels of a motor vehicle, means for driving the opposite non-driving wheels of the motor vehicle, each of said means including a rotatable shaft associated with each wheel, means for connecting the said driven means with said driving means, and means for determining the relative braking resistance applied to the opposite driving wheels, respectively, and to the opposite non-driving wheels, respectively, including a movable means associated with each of said shafts, and independently movable in response to torque transmitted through its associated shaft, a pair of balance levers associated with the driving and driven means, respectively, each balance lever being connected at its opposite ends to the respective torque responsive movable means associated with opposed shafts for resisting similar simultaneous movement of those torque responsive movable means but permitting movement thereof in opposite directions in response to unequal torques in the opposed shafts.

13. In a device of the class described, the combination of a rear pair of rolling elements, means for driving the said roller elements from the drive wheels of a motor vehicle, a front pair of rolling elements, each pair of rolling elements comprising rollers fixedly mounted upon roller shafts, a pair of shafts offset in alignment from the respective pairs of roller shafts, means mounted for pivotal movement connecting the respective roller shafts with the respective offset shafts, a pair of pivotally mounted balance levers for resisting pivotal movements of said connecting means, means connecting the opposite ends of each of the balancing levers with the respective means connecting each pair of roller shafts to its associated offset shaft, and means for rotatably connecting the offset shaft associated with the rear rolling elements with the offset shaft associated with the front rolling elements.

14. In a device of the class described, the combination of a pair of spaced rotatable members, means for driving said members from the drive wheels of a motor vehicle, a pair of shafts rotatably coupled to the rotatable members, an offset shaft, gears connecting said offset shaft to the shafts driven by the rotating members, flexible joints interposed in said gear connections between the shafts driven by said rotating members and the offset shaft, and a balance indicating means for indicating relative yielding of said flexible joints.

15. In a brake tester, the combination of pairs of spaced rollers adapted to be driven from the driving wheels of a motor vehicle, a shaft, a pair of means, each of which is associated with and yieldingly connects one of said respective spaced rollers to said shaft in proximity to opposite ends of said shaft, each of said means being movably mounted and tending to move in response to torque applied therethrough from its associated roller to said shaft, a balancing lever for resisting similar movements of said pair of means, and means for indicating directly the relative displacement therebetween, and means connecting the opposite ends of said balancing lever with said respective movable means, said indicating means including but one relatively movable indicating element.

ROBERT GRANT.

REFERENCES CITED

The following references are of record in the file of this patent:

UNITED STATES PATENTS

| Number | Name | Date |
| --- | --- | --- |
| 1,452,783 | Bishop | Apr. 24, 1923 |
| 1,746,718 | Smith | Feb. 11, 1930 |
| 1,830,340 | Smith et al. | Nov. 3, 1931 |
| 1,871,147 | Brogan | Aug. 9, 1932 |
| 2,012,142 | Shroyer | Aug. 20, 1935 |
| 2,022,340 | Deane | Nov. 26, 1935 |
| 2,036,653 | Starr | Apr. 7, 1936 |
| 2,171,283 | Wochner | Aug. 29, 1939 |